(12) United States Patent
Niese

(10) Patent No.: US 6,877,633 B2
(45) Date of Patent: Apr. 12, 2005

(54) STEAM PRESSURE COOKER

(76) Inventor: Ursula Niese, Vogelsherd 17, 67745, Grumbach (DE)

(*) Notice: Subject to any disclaimer, the term of this patent is extended or adjusted under 35 U.S.C. 154(b) by 305 days.

(21) Appl. No.: 10/254,356

(22) Filed: Sep. 25, 2002

(65) Prior Publication Data
US 2003/0024936 A1 Feb. 6, 2003

Related U.S. Application Data

(63) Continuation of application No. PCT/DE01/00957, filed on Mar. 13, 2001.

(30) Foreign Application Priority Data

Mar. 27, 2000 (DE) .......................................... 100 14 582

(51) Int. Cl.$^7$ .......................... A47J 27/08; B65D 45/00
(52) U.S. Cl. ...................... 220/315; 220/316; 220/378; 220/912; 99/403
(58) Field of Search ................................ 220/315, 316, 220/573.1, 912, 378, 304, 795, 806; 99/337, 403

(56) References Cited

U.S. PATENT DOCUMENTS

| | | | | |
|---|---|---|---|---|
| 4,276,990 A | * | 7/1981 | Chiodo ........................ 220/304 |
| 4,434,909 A | * | 3/1984 | Ott .............................. 220/316 |
| 4,592,479 A | * | 6/1986 | Resende ...................... 220/304 |
| 5,229,563 A | * | 7/1993 | Isogai et al. .................. 99/331 |
| 5,297,473 A | * | 3/1994 | Thelen et al. ................ 220/316 |
| 5,641,085 A | * | 6/1997 | Lonbardo .................... 220/378 |
| 5,715,743 A | * | 2/1998 | Goddard ...................... 220/912 |
| 5,927,183 A | * | 7/1999 | Lee ............................. 220/912 |
| 6,116,151 A | * | 9/2000 | Fickert et al. ............... 220/316 |

FOREIGN PATENT DOCUMENTS

EP 0 108 203 2/1988

* cited by examiner

Primary Examiner—Nathan J. Newhouse
(74) Attorney, Agent, or Firm—Henry M. Feiereisen

(57) ABSTRACT

A steam pressure cooker includes a pot having an outwardly directed horizontal pouring rim and formed with a V-shaped circumferential depression which points inwardly to define a conical surface in an upper rim area. A lid can be placed upon the pot for closing and includes a circumferential groove. Positioned between pot and lid is a rubberized elastic sealing element which is held in the circumferential groove. The sealing element has a sealing body of substantially U-shaped configuration to define two sealing lips in coaxial parallel relationship to the vertical pot axis. One sealing lip bears against an inner wall of the pot and interacts with the conical surface of the pot, when the lid is placed upon the pot. A locking mechanism embraces and thereby clamps the lid and the pouring rim, when the steam pressure cooker is closed, and clears the pouring rim, when the steam pressure cooker is opened.

3 Claims, 1 Drawing Sheet

STEAM PRESSURE COOKER

CROSS-REFERENCES TO RELATED APPLICATIONS

This application is a continuation of prior filed copending PCT International application no. PCT/DE01/00957, filed Mar. 13, 2001, which was published in English and which designated the United States and on which priority is claimed under 35 U.S.C. §120, the disclosure of which is hereby incorporated by reference.

This application claims the priority of German Patent Application Serial No. 100 14 582.5, filed Mar. 27, 2000, pursuant to 35 U.S.C. 119(a)–(d), the disclosure of which is incorporated herein by reference.

BACKGROUND OF THE INVENTION

The present invention relates, in general, to a steam pressure cooker.

A steam pressure cooker is known having a pot with a horizontal pouring rim, which is angled outwards. A lid can be placed upon the pot for closing the pot. Positioned between lid and pot is a rubberized elastic sealing element, which is held in a circumferential groove of the lid and has a sealing lip bearing against the inside wall of the pot. A locking mechanism is provided to embrace and thereby clamp the lid and pouring rim, when the steam pressure cooker is closed, and clears the pouring rim, when the steam pressure cooker is opened.

This type of steam pressure cooker suffers shortcomings because the sealing between the pot and lid poses a significant problem.

Suitably, the sealing element is arranged in such a way that with increasing pressure, the sealing element is pressed towards the position to be sealed. Reference is made, for example, to European Pat. No. EP 0 108 203 B1. However, at low pressure, e.g., during initial phase of the cooking process, leakage frequently occurs in the area of the sealing element.

Another frequently occurring problem is that either the sealing element can only be replaced at great difficulty or the area of the sealing element is difficult to clean.

It would therefore be desirable and advantageous to provide an improved seal between the pot and lid of the steam pressure cooker, which seal obviates prior art shortcomings and is constructed to be impermeable to steam at both low and high pressures and is also easy to assemble and easy to maintain.

SUMMARY OF THE INVENTION

According to one aspect of the present invention, a steam pressure cooker, includes a pot having a horizontal outwardly angled pouring rim and provided with a V-shaped circumferential depression, which points inwardly to define a conical surface in an upper rim area; a lid constructed for centered placement upon the pot for closing the pot and including a circumferential groove; a rubberized elastic sealing element positioned between the pot and the lid and held in the circumferential groove, with the sealing element having a sealing body of substantially U-shaped configuration to define two sealing lips in coaxial parallel relationship to the vertical axis of the pot, wherein one of the sealing lips bears against an inner wall of the pot and interacts with the conical surface of the pot, when the lid is placed upon the pot; and a locking mechanism embracing and thereby clamping the lid and the pouring rim, when the steam pressure cooker is closed, and clearing the pouring rim, when the steam pressure cooker is opened.

The present invention enables the sealing lip of the sealing element to bear against the wall of the pot, away from the area of the pouring rim. Thus, the pouring rim can be configured of narrow design, also because a resultant stability loss can be more than compensated by the provision of the depression. With this construction, a movement of the seal to realize the sealing action is slight. Since the conical surface extends slantingly to the sealing lip, a complete and tight seal is realized from the onset as the sealing lip runs against the conical surface. Due to the increase in rigidity of the pot, the pot can have a thinner nominal wall thickness while maintaining same strength properties. As a consequence of the U-shaped configuration of the sealing element, one sealing lip prevents steam from escaping between the groove and the sealing element, while the other sealing lip seals the area between the pot and the lid.

According to another feature of the present invention, the outer one of the sealing lips may have an inside circumferential groove in an area of attachment to the sealing body of the sealing element. In this way, positioning of the outer sealing lip upon the conical surface is facilitated.

According to another feature of the present invention, the outer one of the sealing lips may have an outer diameter which is smaller than a nominal diameter of the pot.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
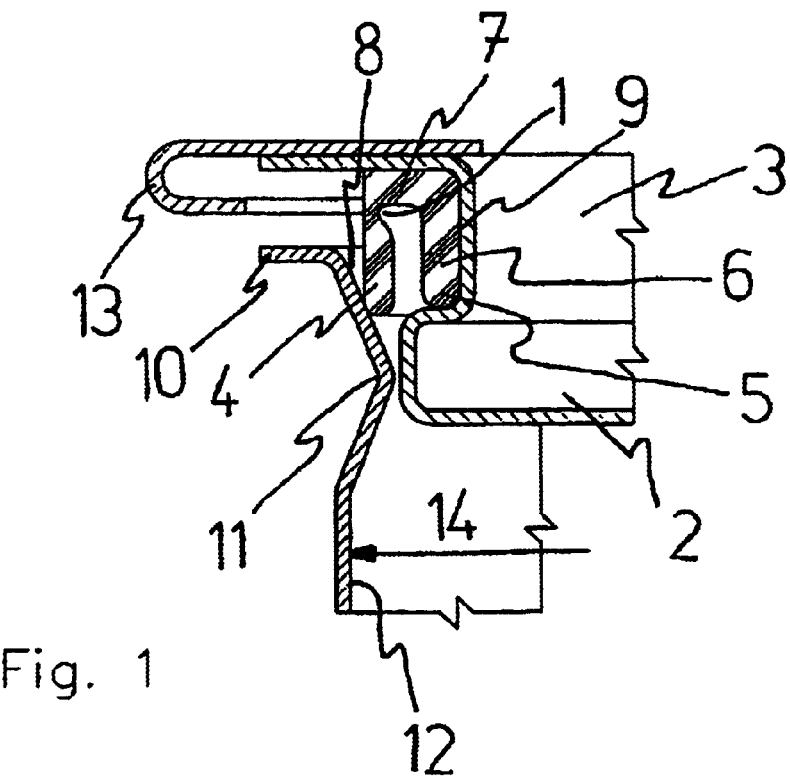
FIG. 1 is a fragmentary sectional view of a steam pressure cooker according to the present invention, showing in detail an external rim section of the pot and lid of the steam pressure cooker in an opened state.

Throughout all the Figures, same or corresponding elements are generally indicated by same reference numerals.

Turning now to the drawing, and in particular to FIG. 1, there is shown a fragmentary sectional view of a steam pressure cooker according to the present invention, including a pot 12 with a horizontal pouring rim 10 protruding outwards, and a centrally placed lid 3 on top of the pot 12. A rubberized elastic sealing element 6 is held in a circumferential groove 9 of the lid 3 and has a sealing body 7 with sealing lips 4, 5. The sealing lips 4, 5 are positioned in coaxial parallel relationship to the vertical axis of the pot 12 and have a diameter that is smaller than the nominal diameter 14 (inner diameter underneath a depression 11) of the pot 12.

The sealing element 6 is essentially U-shaped, and both arms of the U-shaped sealing element 6 that form the sealing lips 4, 5 essentially extend parallel to the wall of the pot 12, when the lid 3 is not attached to the pot 12. The U-shaped configuration of the sealing element 6 provides a resiliency of the two sealing lips 4, 5, when they are pressed against each other. The spring effect is adjustable by varying the dimensions of the sealing body 7 and the sealing lips 4, 5.

The outer sealing lip 4 has in the area of attachment to the sealing body 7 a circumferential inside groove 1 which increases the mobility of the outer sealing lip 4 towards the inner sealing lip 5. The groove 1 should not be too pronounced, since this would weaken the elastic reaction of the outer sealing lip 4.

In addition, a locking mechanism 13 is provided which embraces and thereby clamps the lid 3 and pouring rim 10, when the steam pressure cooker 2 is closed, and clears the pouring rim 10, when the steam pressure cooker 2 is opened.

Figure 2:
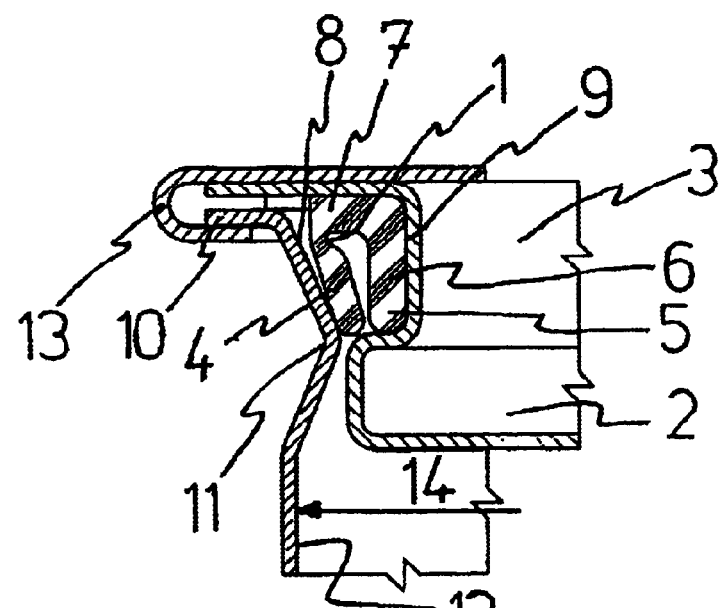
FIG. 2 is a sectional view of the external rim section of the pot and lid of the steam pressure cooker of FIG. 1 in a closed state.

In the upper rim area underneath the pouring rim 10, the pot 12 has a V-shaped circumferential depression 11 pointing towards the inside, thus forming a conical shaped surface 8 in its upper rim area. As shown in FIG. 1, the outer sealing lip 4 of the sealing element 6 runs against the conical surface 8 as the steam pressure cooker 2 is closed to thereby immediately seal the contents of the pot 12 from the environment. As the steam pressure cooker is closed more tightly, the outer sealing lip 4 slides along the conical surface 8 and is bent towards the inner sealing lip 5. This bending action is hereby facilitated by the circumferential groove 1. When the pot 12 is closed and the locking mechanism 13 is clamped around the pouring rim 10, as shown in FIG. 2, the outer sealing lip 4 has basically moved along the conical surface 8 and rests just shy of the inner sealing lip 5. As a consequence of the V-shaped depression 11, the gap between the rim of the pot 12 and the lid 3 is small and is sealed by the sealing element 6 press-fitted between the conical surface 8 and the circumferential groove 9.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A steam pressure cooker, comprising:
    a pot defining a vertical axis and having a horizontal pouring rim, which is angled outwards, said pot provided with a V-shaped circumferential depression, which points inwardly to define a conical surface in an upper rim area;
    a lid constructed for centered placement upon the pot for closing the pot and including a circumferential groove;
    a rubberized elastic sealing element positioned between the pot and the lid and held in the circumferential groove, said sealing element having a sealing body of substantially U-shaped configuration to define two sealing lips in coaxial parallel relationship to the vertical axis of the pot, wherein one of the sealing lips bears against an inner wall of the pot and interacts with the conical surface of the pot, when the lid is placed upon the pot; and
    a locking mechanism embracing and thereby clamping the lid and the pouring rim, when the steam pressure cooker is closed, and clearing the pouring rim, when the steam pressure cooker is opened.

2. The steam pressure cooker of claim 1, wherein an outer one of the sealing lips has an inside circumferential groove in an area of attachment to the sealing body of the sealing element.

3. The steam pressure cooker of claim 1, wherein an outer one of the sealing lips has an outer diameter which is smaller than a nominal diameter of the pot.

* * * * *